US007793707B2

(12) United States Patent
Klein et al.

(10) Patent No.: US 7,793,707 B2
(45) Date of Patent: Sep. 14, 2010

(54) FLUID COOLING DEVICE

(75) Inventors: Winfried Klein, Wallerfangen (DE); Andreas Welsch, Saarlouis (DE)

(73) Assignee: Hydac System GmbH, Sulzbach/Saar (DE)

( * ) Notice: Subject to any disclaimer, the term of this patent is extended or adjusted under 35 U.S.C. 154(b) by 907 days.

(21) Appl. No.: 10/563,876

(22) PCT Filed: Mar. 5, 2004

(86) PCT No.: PCT/EP2004/002237

§ 371 (c)(1),
(2), (4) Date: Nov. 20, 2006

(87) PCT Pub. No.: WO2005/005843

PCT Pub. Date: Jan. 20, 2005

(65) Prior Publication Data

US 2007/0163759 A1 Jul. 19, 2007

(30) Foreign Application Priority Data

Jul. 10, 2003 (DE) ................................ 103 31 216

(51) Int. Cl.

| | |
|---|---|
| ***B60H 1/00*** | (2006.01) |
| ***B60H 3/00*** | (2006.01) |
| ***F24H 3/00*** | (2006.01) |
| ***F01N 5/02*** | (2006.01) |
| ***F02M 31/08*** | (2006.01) |
| ***F28F 13/12*** | (2006.01) |
| ***F28D 1/06*** | (2006.01) |
| ***F28D 7/10*** | (2006.01) |

(52) U.S. Cl. ............................ 165/47; 165/41; 165/42; 165/43; 165/51; 165/52; 165/122; 165/132; 165/140

(58) Field of Classification Search .................. 165/47, 165/164, 41, 42, 43, 51, 52, 104.33, 120, 165/122, 112, 132, 140
See application file for complete search history.

(56) References Cited

U.S. PATENT DOCUMENTS

| | | | | |
|---|---|---|---|---|
| 4,878,536 | A * | 11/1989 | Stenlund ..................... | 165/119 |
| 6,354,089 | B1 * | 3/2002 | Lech et al. ................... | 62/50.2 |

FOREIGN PATENT DOCUMENTS

| | | |
|---|---|---|
| DE | 197 44 599 | 4/1999 |

(Continued)

*Primary Examiner*—Frantz F Jules
*Assistant Examiner*—Travis Ruby
(74) *Attorney, Agent, or Firm*—Roylance, Abrams, Berdo & Goodman L.L.P.

(57) ABSTRACT

A fluid cooling device embodied as a modular unit includes a drive motor (10) driving a ventilation wheel (12) and a fluid pump (14) that supplies a first type of fluid into a fluid system, and leads to a heat exchanger (22) from which the fluid is redirected into the fluid system in a tempered manner. A second fluid pump (32) is used to extract a second type of fluid from the reservoir (30) and to supply the second type of fluid to a second fluid system, from which the second type of liquid is redirected towards the reservoir (30) in a guiding manner via the first heat exchanger (22) and the second heat exchanger (24). The second fluid pump enables different tempering operations to be carried out for separate fluid systems, using only one fluid cooling device.

7 Claims, 1 Drawing Sheet

FOREIGN PATENT DOCUMENTS

| | | |
|---|---|---|
| DE | 100 62 534 | 7/2001 |
| EP | 0 968 371 | 1/2000 |
| EP | 1 199 410 | 4/2002 |
| JP | 63 140811 | 10/1988 |
| JP | 11 022461 | 4/1999 |

* cited by examiner

FLUID COOLING DEVICE

FIELD OF THE INVENTION

The present invention relates to a fluid cooling device as a structural unit having a drive motor driving a fan wheel and a fluid pump. The fluid pump delivers a first type of fluid to a fluid working circuit which in operation basically heats the fluid, and leads to a heat exchanger from which the fluid returns cooled to the fluid working circuit.

BACKGROUND OF THE INVENTION

EP 0 968 371 B1 discloses a fluid cooling device as a structural unit with a drive motor driving a fan wheel and a fluid pump. The fluid pump takes fluid (hydraulic medium) from an oil tank and delivers it to a hydraulic working circuit which heats the fluid, and leads to a heat exchanger from which the fluid returns cooled to the oil tank. In the known solution, the oil tank is made trough-shaped. With its upwardly drawn edges in the manner of a half shell, the oil tank at least partially encloses the motor and the fluid pump. Accordingly, with the known solution the oil tank has a relatively large volume, is still a component of the fluid cooling device in a space-saving compact design, and ensures good accessibility of the motor and fluid pump unit for mounting and maintenance purposes as a result of the installation space left open by the trough edges. In addition to a compact design for the fluid cooling device, the mass components of the cooling device are uniformly distributed, so that in operation a safe upright position is achieved even with the corresponding inherent movements and vibrations.

A control system and process for controlling the speed of a plurality of fans for cooling a plurality of flow agents in a machine are disclosed in DE 100 62 534 A1. The speed of each fan is controlled according to the individual heat dissipation requirements of special heat transfer cores attended by this special fan. This control system has a plurality of sensors positioned to sense the temperature of each of the plurality of flow agents. Each sensor can be operated to output a signal indicating the temperature of this special flow agent. An electronic control device is coupled to a plurality of sensors to receive signals from the sensors which pick up the temperature of each of the plurality of flow agents. Based on these temperature signals, in the known device the electronic control module can determine a corresponding temperature error for each of these flow agents. Based on these temperature error signals and on a certain logic programmed into the electronic control module, the control device outputs a signal to each of the plurality of fans to individually control their speed, each output signal indicating a desired fan speed for this special fan.

With the existing solutions however only one cooling task can ever be performed, i.e., efficient cooling of the heated fluid of a first type, for example, in the form of a hydraulic medium. For other cooling and temperature-control tasks, for example, cooling a fluid of a second hydraulic working circuit (gear oil), the known devices must be provided again so that an independent cooling device with a drive motor, pump, and cooler consequently is required for each hydraulic circuit and each cooling task.

SUMMARY OF THE INVENTION

An object of the present invention is to provide an improved fluid cooling device by which several temperature-control tasks can be performed with only one fluid cooling device.

This object is basically achieved by a fluid cooling device with a second fluid pump in which fluid can be taken from a storage tank and can be delivered to a second fluid working circuit from which the second type of fluid returns in a guided manner to the storage tank by the first and second heat exchangers. Various temperature-control tasks for separate fluid working circuits can be performed with only one fluid cooling device. Furthermore, with this invention it is possible, especially by the first heat exchanger, to effect heat exchange between the two types of fluid. This arrangement on the one hand leads to a more uniform heat state for the two fluid media. On the other hand, the arrangement can also afford the advantage of heating relatively cold working fluid of a circuit when parts of machinery and systems are started by the then possible warmer fluid medium of the other circuit in this way to clearly increase the operating reliability and operating precision.

The fluid cooling device of the present invention is especially suited for cooling of electric drives such as linear motors, as are used, for example, in machining centers and machine tools, where cooling of the electrical components takes place by a water-glycol mixture. Furthermore it can be used for other linear motors, motor spindles, servo motors and comparable devices. The cooling medium in the form of a water-glycol mixture as the second type of fluid is relayed to a plate heat exchanger of the fluid cooling device and there in countercurrent cools the hydraulic medium of a hydraulic fluid working circuit to which likewise the machining center or the machine tool with its drivable components is connected. Due to the heating caused thereby the water-glycol mixture, before it travels back into the storage tank of the fluid cooling device, is cooled by a second heat exchanger in the form of a finned radiator. During start-up, that is, when the hydraulic working circuit with the connected machining center or machine tool is started up, the hydraulic working medium is generally cold and can then by heated up by the water-glycol medium which has been heated to a greater degree. A reliable and precise start-up of operation is achieved. Furthermore, in this way the ratio of the temperatures between the electric components and the hydraulic oil of the hydraulic oil circuit can be optimized. This arrangement likewise contributes distinctly to improving the machining precision.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawing which forms a part of this disclosure and which are schematic and not to scale.

DETAILED DESCRIPTION OF THE INVENTION

Figure 1:
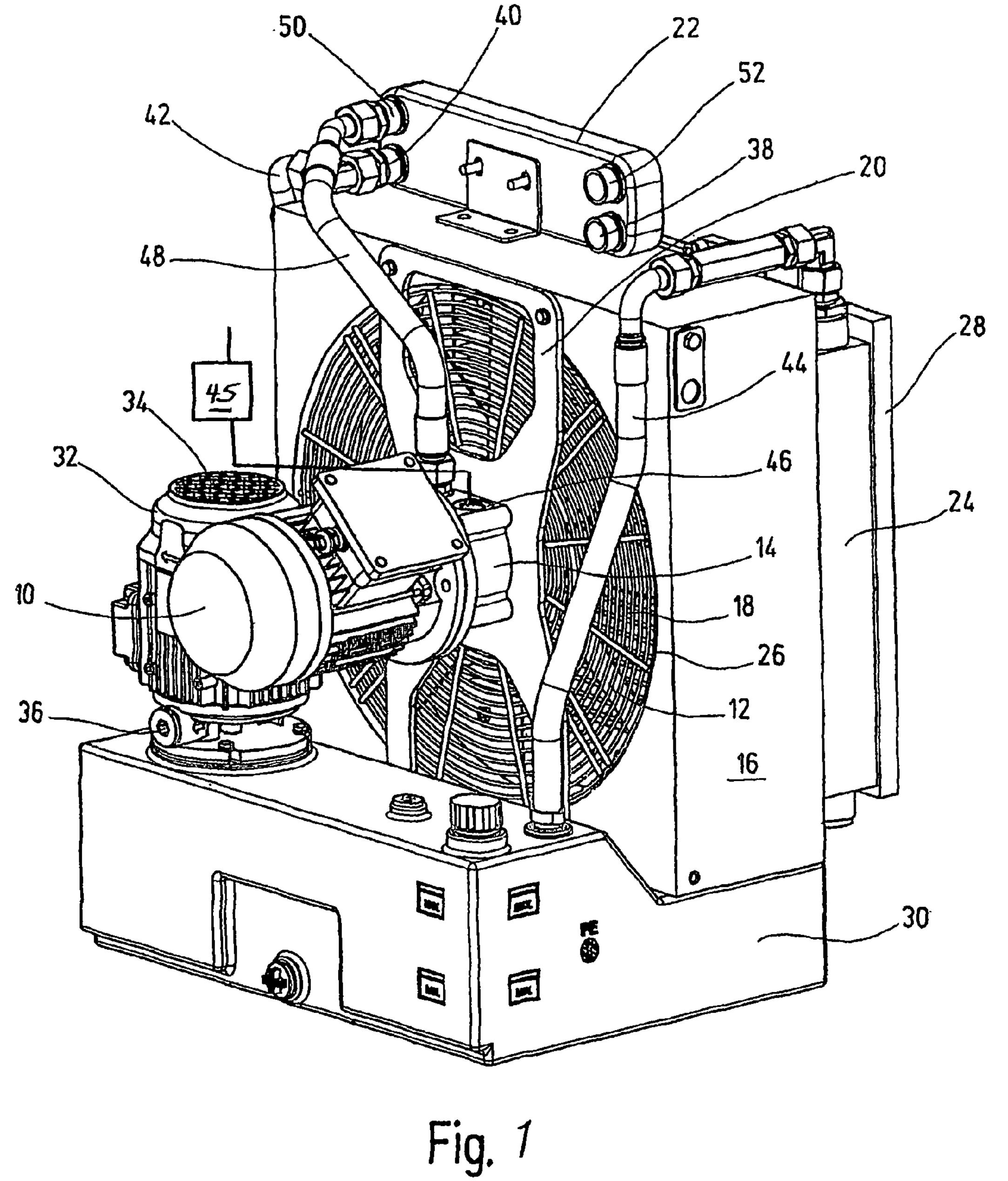
FIG. 1 is a rear perspective view of a fluid cooling device as a structural unit in its installation position according to an exemplary embodiment of the present invention.

The fluid cooling device shown in its entirety in FIG. 1 has an electric drive motor 10 driving a fan wheel 12 with individual fan blades. The drive motor 10 drives a fluid pump 14. The fan wheel 12 is held in a fan wheel housing 16 built preferably from sheet metal parts. For the sake of safety, the fan wheel 12 is covered with a protective grate 18 in the rear area. In the rear area, a flange part 20 provided with openings extends over the opening of the fan wheel housing 16. The unit comprising the drive motor 10, fan wheel 12 and fluid pump 14 is supported on the flange part 20. Above the fan wheel housing 16, there is a heat exchanger 22 in the form of a plate heat exchanger. The front fan wheel housing 16 is covered by a second heat exchanger 24 in the form of a finned radiator extending over the entire free opening cross section of the fan wheel opening 26. The fan wheel 12 is designed as an axial intake fan which, viewed in the direction of the FIGURE, draws air from right to left through the fins of the second heat exchanger 24 and moves it rearward into the rear area in the direction of the drive motor 10.

With a suitable adaptation it is however also possible to reverse this air flow and to design the fluid cooling device as an axial pressure fan. In order to keep the fins of the finned radiator (second heat exchanger) 24 free of dirt, on its free front side it is overlapped by a plate-shaped air filter 28. The fan wheel housing 16 is designed as a hollow box and stands vertically on a storage tank 30 forming an increased tank chamber volume to increase its fluid volume in the rear area in the vertical direction. Adjacent to the first drive motor 10 in the back area of the storage tank 30, a submersible pump 32 is seated on storage tank 30. The pump parts (not shown) for removing fluid from the storage tank 30 project into the storage tank. Accordingly the electric drive motor 34 of the submersible pump 32 is visible in the FIGURE. This submersible pump 32 has a pump opening 36 for removing fluid from the storage tank 30.

This pump opening 36 supplies a fluid working circuit (not shown) used preferably for cooling the electric linear drive of a machining center or a machine tool. Especially a water-glycol mixture (second type of fluid) is used as the fluid. After passing through the electrical consumer for its cooling, the water-glycol mixture is delivered by the submersible pump 32 into the plate heat exchanger 22, specifically by corresponding tubing (not detailed) which discharges into the lower port 38 of the plate heat exchanger 22. From there the second type of fluid (water-glycol mixture) flows through the plate heat exchanger 22 and leaves it through the lower delivery port 40.

This delivery port 40 is in turn connected to carry fluid to the second heat exchanger 24 by a transverse pipe 42. The water-glycol mixture heated in the plate or first heat exchanger 22 is cooled during operation of the fan wheel 12 by cooling air in the second heat exchanger 24 in the form of a finned radiator by the water-glycol mixture traveling in this way through the second heat exchanger 24. After passing through this cooling step, the water-glycol mixture travels by the connecting pipe 44 back into the storage tank 30. Connecting pipe 44 establishes the connection between the top of the storage tank 30 and the top of the second heat exchanger 24 to carry fluid. After return to the storage tank 30, this water-glycol mixture is available cooled for a new circulation process by the submersible pump 32.

The fluid pump 14 is used to deliver a first type of fluid in the form of a hydraulic medium such as hydraulic oil. With this hydraulic oil the hydraulic assemblies of a machining center or a machine tool can appropriately be triggered and operated. The second storage tank 45 for the hydraulic oil is located outside of the fluid cooling device shown in the FIGURE so that from there the fluid pump 14 intakes the hydraulic oil by its intake opening 46 and relays it to the pump line 48. This fluid-carrying pump line 48 is in turn connected to the plate heat exchanger 22 above the delivery port 40 by the input opening 50. The hydraulic oil travels by the pertinent input opening 50 into the plate heat exchanger 22 and flows through it in countercurrent to the water-glycol mixture from left to right. The hydraulic oil cooled or temperature-treated in this way travels by the outlet 52 located above the lower port 38 back into the hydraulic working circuit (not detailed) to which the hydraulic assembly and the hydraulic tank of the entire system are connected.

With the fluid cooling device of this invention, heated hydraulic oil of a system can be cooled by the plate heat exchanger 22. This cooling or temperature control takes place in countercurrent by the water-glycol mixture stored in the storage tank and delivered by the submersible pump 32 for circulation. The water-glycol mixture heated in the plate heat exchanger 22 is then cooled by the finned radiator 24 as it continues to circulate. If at the start of operation of the hydraulic system the hydraulic medium is cold, it is possible to heat the cold hydraulic oil by the water-glycol mixture which may be warmer and in this way to facilitate the start-up of operation. With respect to the interface in the form of the first heat exchanger 22, the temperature behavior in the two circuits is made uniform, in turn affecting the machining precision for the entire system.

The illustrated fluid cooling device can also be used for other applications in which temperature-control tasks for different fluid circuits arise. Furthermore, it is possible to insert or mount separable tank chambers in the storage tank 30 so that other fluid media can be stored by the storage tank of the fluid cooling device as a structural unit. It is also possible, in addition to the illustrated fluid pump 14 and the submersible pump 32, to mount other pumps together with other heat exchangers (not shown) to trigger more than two fluid media with respect to temperature.

While one embodiment has been chosen to illustrate the invention, it will be understood by those skilled in the art that various changes and modifications can be made therein without departing from the scope of the invention as defined in the appended claims.

What is claimed is:

1. A fluid cooling device forming a structural unit, comprising:

a first drive motor having a first drive axis;

a fan wheel connected to and driven by said first drive motor;

a first fluid pump conveying a first fluid of hydraulic oil;

a first plate heat exchanger in fluid communication with said first pump to convey said first fluid through said first heat exchanger to treat thermally said first fluid in a temperature controlled way;

a storage tank forming an integral part of the device, containing a second fluid of a water-glycol mixture and being positioned vertically forming a housing for said fan wheel;

a second heat exchanger in fluid communication with said storage tank, said second heat exchanger being a finned radiator exposed to cooling air from said fan wheel to cool said second fluid;

a second pump being a submersible pump mounted on said storage tank to convey said second fluid from said storage tank through said first and second heat exchangers and back to said storage tank such that heat is exchanged between said first and second fluids in said first heat exchanger; and an electrical second drive motor connected to said second pump on said storage tank and having a second drive axis, said first and second drive axes extending perpendicularly relative to each other within the device.

2. A fluid cooling device according to claim 1 wherein a second storage tank for said hydraulic oil is connected in fluid communication with said first pump.

3. A fluid cooling device according to claim 2 wherein said first pump and said first heat exchanger are part of a hydraulic circuit; and a fluid circuit of said second fluid comprises at least one electric drive being a linear motor.

4. A fluid cooling device according to claim 1 wherein said first pump and said first heat exchanger are part of a hydraulic circuit; and a fluid circuit of said second fluid comprises at least one electric drive being a linear motor.

5. A fluid cooling device according to claim 1 wherein said first heat exchanger is mounted on said housing.

6. A fluid cooling device according to claim 1 wherein said second heat exchanger is coupled to said housing.

7. A fluid cooling device according to claim 6 wherein said first heat exchanger is mounted on said housing.

* * * * *